United States Patent Office 3,191,775
Patented June 29, 1965

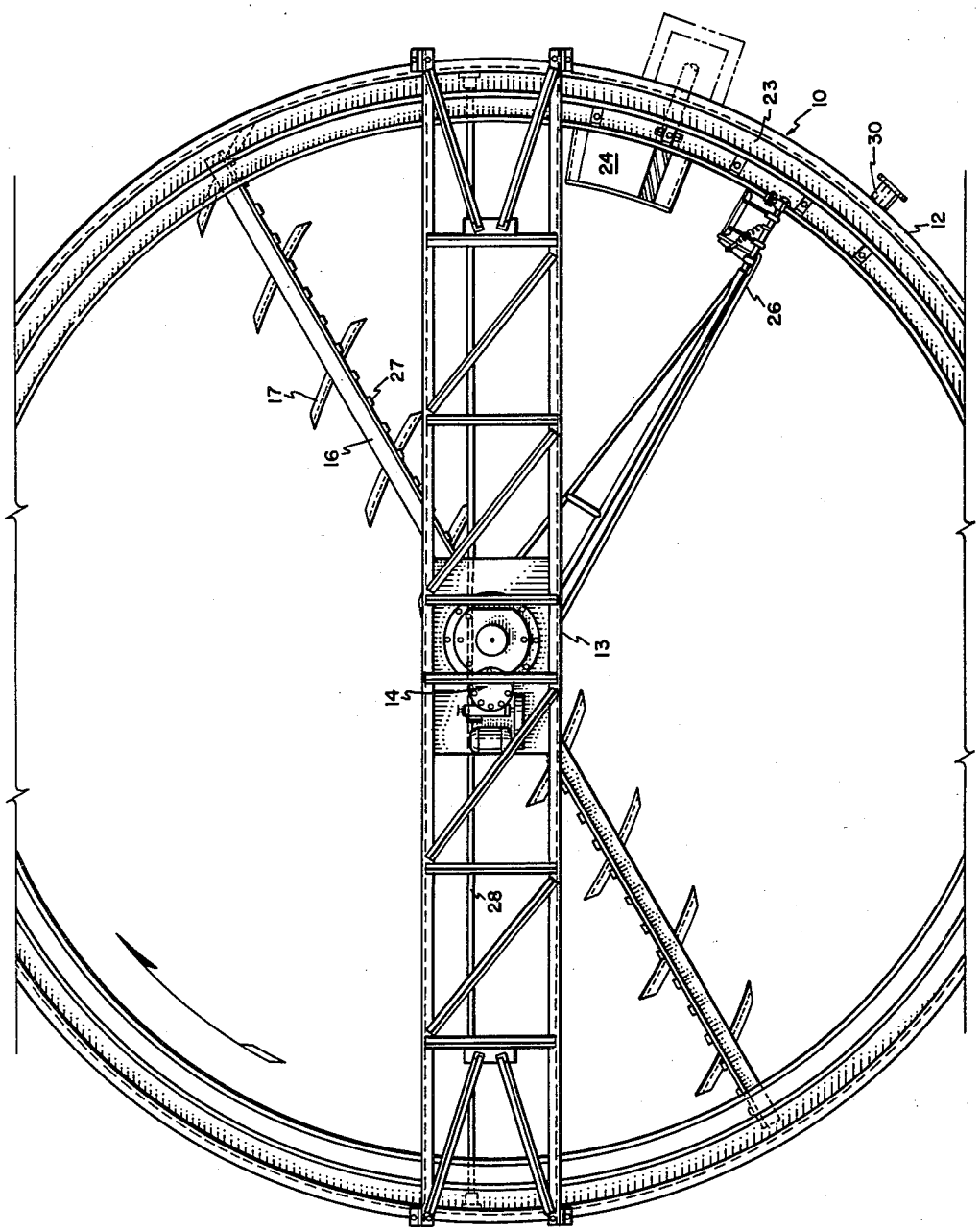
FIG. I

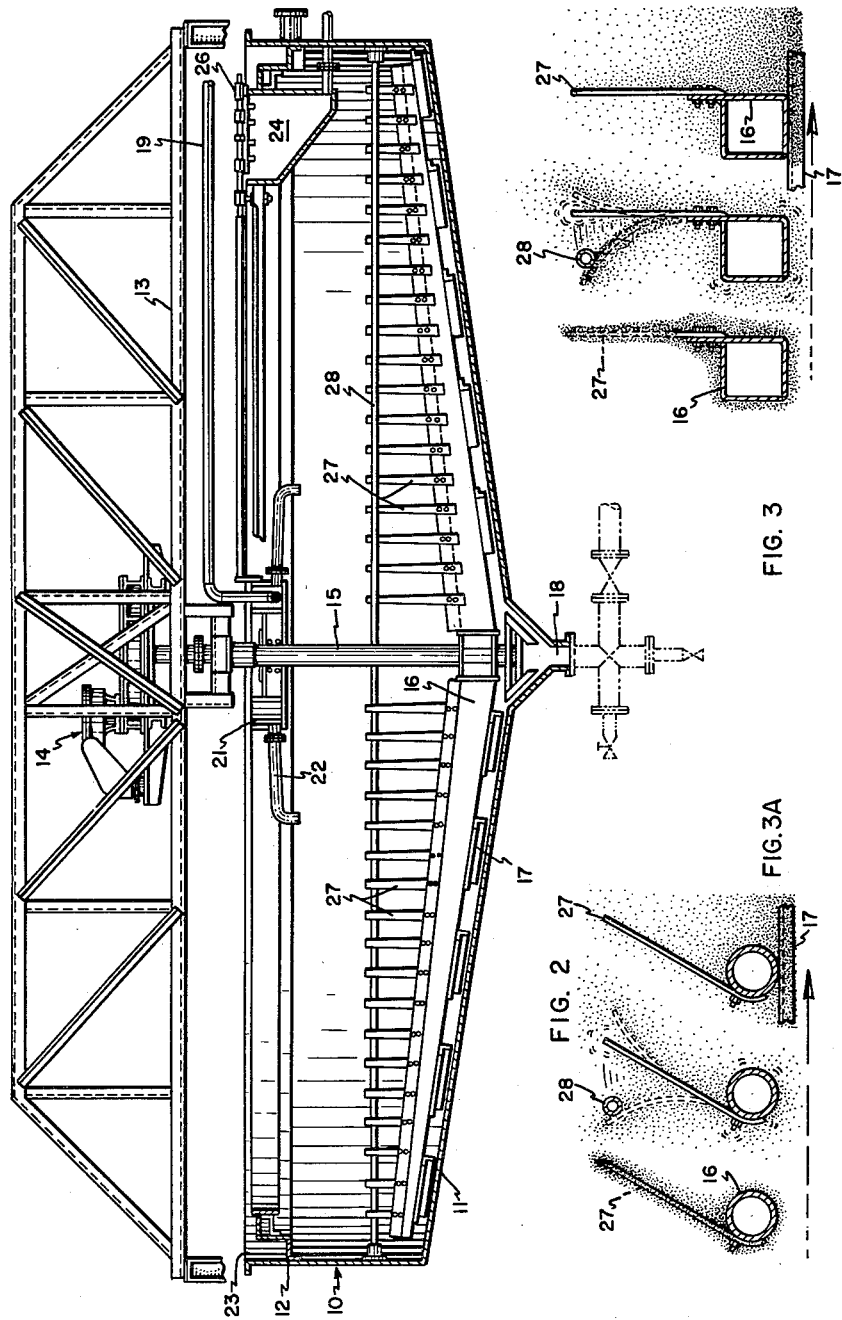

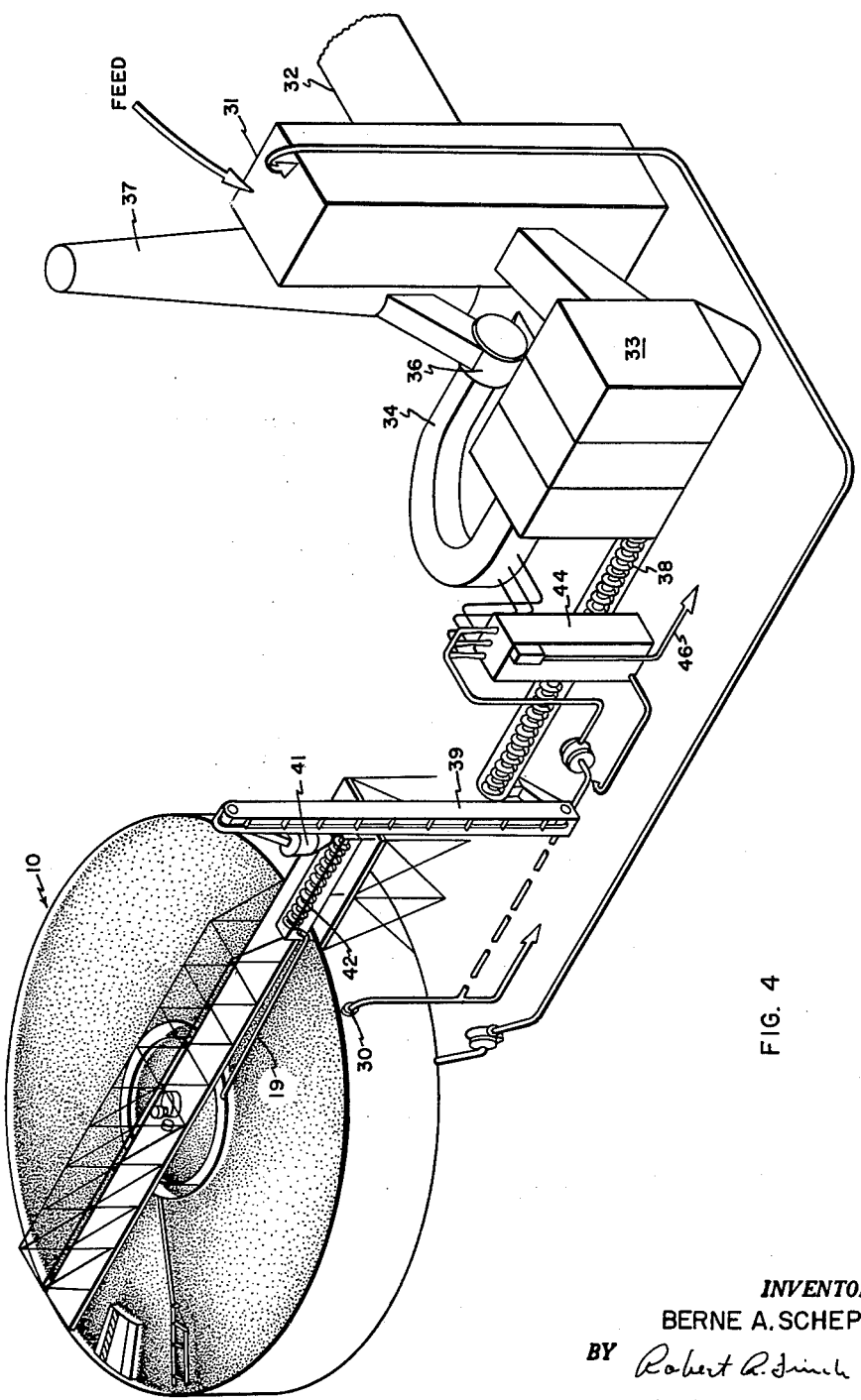

3,191,775
CONCENTRATION OF SUSPENDED SOLIDS
Berne A. Schepman, Salt Lake City, Utah, assignor to The Eimco Corporation, Salt Lake City, Utah, a corporation of Delaware
Continuation of application Ser. No. 121,478, July 3, 1961. This application Mar. 12, 1964, Ser. No. 352,425
5 Claims. (Cl. 210—528)

This is a continuation of application Serial No. 121,478 filed July 3, 1961, and now abandoned.

This invention relates generally to the concentration and recovery of solids from a suspending liquid; and in particular to the concentration and recovery of extremely fine solids, such as kiln dust, leached finely ground ores, and the like, which are normally resistant to concentration or difficult to concentrate by usual sedimentation methods and apparatus.

It is a primary object of the invention to provide ways and means for effecting concentration and recovery of finely divided solids from a suspending liquid.

Another object is a provision of a specific apparatus for carrying out such concentration on a continuous basis.

A related object is the provision of an apparatus arrangement and a method of operating the same for the wetting, leaching, concentration and recovery of the dust discharged from a cement kiln.

In the art of sedimentation to effect separation of solids from a suspending liquid, it is well known to concentrate such solids in sedimentation apparatus by subjecting them to the stirring action of paddles or rakes in the bottom of the sedimentation basin. Normally, such stirring occurs for some vertical distance above the bottom of the basin and is frequently effected by means of the members of the raking arms to which blades are attached, vertically extending stilts or rods to the bottom of which are appended rake blades for moving the settled material to discharge, or stationary pickets extending above the arms. It has been demonstrated that such stirring action is necessary to obtain a sufficiently high solids concentration in the discharge underflow for subsequent process and handling requirements.

In such concentration of fine solids as heretofore practiced, a primary problem has been the continuous build up of solids on the supporting mechanism. Such build up places an undue burden on the equipment and requires shut down for cleanup lest the load bearing capabilities of the structure be exceeded. Moreover, the build up interferes with the normal stirring action.

Because solids accumulation is inevitable, usual prior practice has been to build massive mechanisms to sustain the load for an economic period of time before shut down. It has long been known that less build up will occur with a lighter structure presenting less surface, however, lighter structures are incapable of supporting any reasonable loads.

In the present invention, the foregoing problems are overcome by ways and means providing the required structure for raking along with the necessary stirring and concentrating and having integrally therewith means for removing solids accumulation from the mechanism during continuous operation. Significantly the invention enables the use of relatively light structures yet obviates the necessity for shut down to remove accumulated solids.

In accordance with the present invention, there is provided a sedimentation basin or tank having a bottom and upstanding marginal sidewalls and a rotationally mounted raking mechanism of relatively light structure having depending rake blades for moving settled material across the bottom of the basin to the discharge outlet. Above the mechanism and rotating therewith is a plurality of substantially vertical stirring rods or pickets, constructed of flexible spring steel or similar elastic material; and means are provided in the tank for periodically contacting such pickets to deflect them from normal then suddenly release them from the deflected position. This deflection and sudden release imparts a vibration to the pickets and to a lesser degree, to the entire structure to shake off solids accumulated thereon. At the same time, the stirring and kneading effects of the pickets, necessary to proper concentration of solids, continues unimpeded.

As will be discussed in more detail hereinafter, a typical example of fine solids requiring special concentrating techniques is to be found in the cement industry where kiln dust must either be thoroughly wetted and concentrated for recovery or be washed or leached then concentrated prior to return to the kiln in order to prevent undue build up of alkali in the final clinker. Briefly, such systems recover kiln dust and subject it to a leaching operation to remove at least a portion of contained alkali. The solids are concentrated in order to return them to the kiln with an acceptably low moisture content. Heretofore, the cost of concentrating such leached solids has been prohibitive primarily because of the difficulty of obtaining sufficiently high solids concentration in the sedimentation under-flow. As noted, higher concentrations are obtainable by stirring mechanism but the operating difficulties occasioned by solids accumulation has rendered this method uneconomical in many cases.

However, by utilizing the teachings of the present invention, recovery and leaching of the cement kiln dust for return to the system is renedered economicaly feasible.

In order that the invention and its practical application may be more readily understood and carried into effect, reference is made to the accompanying drawings which show, for purposes of illustration, certain embodiments of the invention, the scope of which is defined by the appended claims rather than by any examples or preceding description.

In the drawings:

FIG. 1 is a simplified top elevational view of the concentration apparatus embodying the invention.

FIG. 2 is a side sectional view of the apparatus of FIG. 1, certain parts being shown in elevation.

FIGS. 3 and 3a are views showing, more or less diagrammatically, the function and operation of the self-cleaning concentrating mechanism. In the two figures similar reference numerals are used to designate similar elements.

FIG. 4 is a perspective view of a cement dust leaching and recovery system embodying the invention.

The basic apparatus employed in the invention comprises a tank 10 having a bottom 11 and upstanding sidewalls 12. There is provided a support beam 13, drive mechanism 14, rotatable center column 15 and laterally extending support arms 16 affixed to and rotatable with the center column 15.

Usual rake blades 17 are supplied for moving concentrated solids to a center discharge 18 whence they are removed from the tank.

Feed is supplied via a suitable conduit 19 into a conventional feedwell or mechanism 21 to be distributed via radially extending tubes 22 into the tank proper. As noted, settled material is removed via a suitable discharge 18 while clarified liquor over flows as effluent via a discharge launder 23. Floating scum is removed in usual fashion via a scum outlet 24 to which it is moved by scum skimmer 26.

Referring in particular to FIGS. 2 and 3, it will be noted that the rake supporting arms 16 are provided with upstanding picket-like members 27 which move through the slurry to effect further dewatering and concentration of the partially settled solids. As the rake arm 16 rotates, the pickets 27 pass through the solids effecting stirring and concentration, and eventually bear against a cross member 28 which engages the picket members at a point above their bottom terminal connection to the rake arm 16. Further rotation of the rake arms effects deflection of each picket member as it passes toward and past the cross member. As the picket passes the cross member 28 it snaps rapidly back to its normal operating position. In the illustrated embodiment, the normal position is shown as vertical, however, it may assume other normal positions. Such deflection and release of the deflecting force shakes the entire structure including the rake arm 16 and the subtended blades to effect removal of accumulated solids. At the same time, the kneading and stirring action of the picket members continues without interruption.

Although the deflector 28 is shown as closely adjacent the top of the pickets, it is within the scope of this invention to provide a scraping action by lowering the point of contact between the pickets and deflectors.

In the system illustrated in FIG. 4 the invention is embodied in a cement calcining and leaching operation. In such system, cement bearing material is initially fed into a hopper 31 whence it is fed into the kiln 32 counter-currently to the hot gases. Dust discharged from the kiln passes through a dust collection system, generally designated 33, and the dust-free gases are discharged via a suitable conduit 34, blower 36 and stack 37.

From the dust collector, fine dust is passed via a suitable conveyor 38 to a further conveyor 39 whence it passes through a cyclone type contactor 41 where it is wetted with water for leaching thence passes into a mixer 42 and finally into the feed conduit 19 for supply to the concentration tank. Effluent is discharged at 30 to be conveyed by a conduit to discharge or further use, or via a branch line through a neutralizer 42 where the alkali content of the leach water may be neutralized by means of $CO_2$— bearing gas from the stack 34. Neutralized water may be then discharged via a conduit 46. Use of the leach water neutralizer is optional.

In the system illustrated, the fundamental goal is recovery of kiln dust, however, the dust cannot be directly returned to kiln because it contains an abnormally high percentage of alkali which would result in the final kiln product having an excessive alkali content. In this connection, it may be noted that the total alkali content (potassium and sodium alkali both reported as $Na_2O$) should not exceed 0.6% by weight in the final product. The reason for this is that alkali often reacts with certain aggregates to cause chipping and flaking and these are standards set which must be observed.

The usual raw material contains a significant amount of alkali a major portion of which is discharged from the kiln with the dust. If the dust is wasted, the main clinker material will generally meet the ASTM specifications of 0.6% alkali. However, wasting kiln dust is extremely costly and for that reason, leaching has been resorted to in order to lower its alkali content sufficiently to permit return to the kiln.

As noted, leaching requires a considerable amount of water and consequently solids concentration is required in order to provide a dust of acceptably low moisture content for return to the kiln on an economic basis.

*Example*

A typical plant uses 1083 tons per day kiln feed containing 0.6% total alkali (6.5 tons per day alkali). The required product is a final clinker having less than 0.5% alkali. In order to accomplish this yet maintain maximum production, kiln dust is collected and recycled. With the recycle load and the system in balance, 137 tons per day of dust is added to the kiln feed making a total kiln feed of 1220 tons per day.

A large portion of the alkali is volatilized in the kiln and carried out in the dust. Thus, the kiln dust, which amounts to 140 tons per day, carries an alkali content of 4.41% (6.18 tons per day, alkali). Collected dust is wetted with approximately 1260 tons per day of water in the contactor, then concentrated for recycle to the kiln.

Utilizing the concentrator of the present invention in the above system, there is attained a 55% solids underflow containing 137 tons per day leached solids having an insoluble alkali content of 1.84% and a soluble alkali content of .29%, or a total of 2.85 tons per day alkali in the recycle dust. This, when combined with new feed material gives a kiln feed with an alkali content of 0.77%. However, volatilization in the kiln accounts for a major portion of this alkali and the resulting clinker carries an average alkali content of 0.433% which is well below the acceptable figure in the area in which the operation is conducted.

In the same plant, utilizing the same raw material and rate of feed, but recycling the dust without leaching, the kiln feed (including dust) was 1.04% alkali and the ultimate clinker was 0.88% alkali which is completely unacceptable. In this plant, if strict adherence to the 0.6% maximum alkali content is observed, a large portion of the dust has to be discarded unless there is an economic way to leach and concentrate.

It is to be noted that the concentrator of the present invention is able to operate continuously to yield an underflow containing 55% solids yet requires no shut down for maintenance or clean up. If prior operation in the same plant, but utilizing a sedimentation apparatus without the self cleaning feature, the maximum period of operation was approximately 4 weeks after which the entire system had to be closed down so that the sedimentation apparatus could be thoroughly cleaned of accumulated solids. It should be noted that cleaning of accumulated solids poses a serious problem because when the sedimentation unit is drained the buoyancy effect of the liquid in the tank is lost and the full weight of accumulated solids bears on the mechanism. Thus, clean out must occur at rather frequent intervals lest the accumulation be so great that upon draining for clean-out the structure is loaded to failure.

From the foregoing it is seen that the present invention presents on the one hand a system embodying a particular type of solids concentration in which there is effected concentration of the solids by a kneading action on a continuous basis under conditions whereby self cleaning of the apparatus is made possibly thereby in turn making possible continuous operation of the entire dust collection and leaching system and rendering such system economically attractive.

The invention also provides a particular type apparatus and method of operating the same by which stirring of partially settled solids to effect continuous dewatering to an acceptable consistency is accomplished by means of upstanding substantially vertical flexible pickets operating within a zone of compression or compaction to effect a kneading on the solids to force out additional water; such pickets being continuously cleaned by deflection from normal position and release of the deflecting force.

It is also evident that the present invention makes full use of the normally detrimental tendency for solids to deposit on the stirring mechanism by permitting such deposit concomitantly with the stirring, then release deposited solids to increase the density of the mass. This is a distinct advantage because deposited solids are of a much higher concentration even than those in the concentrated mass, consequently, when released into the mass, contribute an increase in solids concentration. For purposes of this specification and claims, deposited solids are referred to as substantially liquid-free because of their low moisture content compared to non-deposited solids.

It is also to be emphasized that the concept of the present invention, both as to method and apparatus, is not limited to the use in normal sedimentation apparatus but may be efficiently employed in any situation where it is necessary to subject a solids-liquid mass to stirring and there is danger of deposition of solids on the mechanism. Similarly, the invention may be applied to any situation where concentration of solids by stirring is to be effected.

I claim:

1. Apparatus for sedimentation concentration of difficultly settleable solids comprising a tank having a bottom and upstanding marginal sidewalls, means for supplying a solids-liquid suspension to said tank, a solids outlet in a lower portion of the tank for withdrawing concentrated solids therefrom, effluent overflow means in an upper portion of the tank, a rake support arm mounted for rotation in a substantially horizontal plane in a lower portion of said tank and having a plurality of depending rake blades for moving settled solids toward said solids outlet; and means for effecting concentration of settled solids prior to discharge, comprising a plurality of elongated flexible members mounted in spaced apart relationship on said rake support arm to extend generally upwardly therefrom, means for rotatably driving said support, and deflecting means fixedly mounted in said tank in the path traced by said flexible members upon rotation of said support to effect periodic deflection and sudden release of said flexible members.

2. Apparatus for sedimentation concentration of settleable solids comprising a tank having a bottom and upstanding marginal sidewalls, means for supplying a solids-liquid suspension to said tank, a solids outlet in a lower portion of the tank for withdrawing concentrated solids therefrom, effluent overflow means in an upper portion of the tank, a rake support arm mounted for movement in a substantially horizontal plane in a lower portion of said tank and having a plurality of depending rake blades for moving settled solids toward said solids outlet; and means for effecting concentration of settled solids prior to discharge, comprising a plurality of elongated flexible members mounted in spaced-apart relationship on said rake support arm to extend generally upwardly therefrom, means for driving said support to move it in said tank and deflecting means fixedly mounted in said tank in the path traced by said flexible members upon movement of said support to effect periodic deflection and sudden release of said flexible members.

3. Apparatus according to preceding claim 1 in which said deflecting means comprises an elongated member fixedly mounted transversely in said tank at an elevation above said rake support arms.

4. Apparatus according to preceding claim 2 in which said deflecting means comprises an elongated member fixedly mounted transversely in said tank at an elevation above said rake support arm.

5. Apparatus for sedimentation concentration of settleable solids, comprising a tank having a bottom and upstanding marginal sidewalls, means for supplying a solids-liquid suspension to said tank, means for withdrawing settled solids from a lower portion of the tank, effluent outlet means in an upper portion of the tank, and means for effecting concentration of settled solids prior to discharge, comprising an elongated arm mounted for movement through said tank, a plurality of spaced apart elongated flexible members secured at one end only to said arm to extend generally transversely therefrom, means for driving said arm to move it in said tank, and deflecting means fixedly mounted in said tank in the path traced by the unsecured ends of said flexible members upon movement of said arm to effect periodic deflection and sudden release of said flexible members.

References Cited by the Examiner

UNITED STATES PATENTS

| | | | |
|---|---|---|---|
| 2,881,922 | 4/59 | Kelly | 210—528 X |
| 2,899,071 | 8/59 | Bounin | 210—527 |
| 2,913,116 | 11/59 | Cover | 261—7 X |
| 2,793,866 | 3/61 | Genter et al. | 210—519 |

REUBEN FRIEDMAN, *Primary Examiner.*